United States Patent
Cumpian, Jr.

(10) Patent No.: US 10,159,238 B2
(45) Date of Patent: Dec. 25, 2018

(54) PORTABLE LIGHTING SYSTEM

(71) Applicant: Joe L. Cumpian, Jr., San Antonio, TX (US)

(72) Inventor: Joe L. Cumpian, Jr., San Antonio, TX (US)

( * ) Notice: Subject to any disclaimer, the term of this patent is extended or adjusted under 35 U.S.C. 154(b) by 99 days.

(21) Appl. No.: 15/379,699

(22) Filed: Dec. 15, 2016

(65) Prior Publication Data
US 2018/0172224 A1    Jun. 21, 2018

(51) Int. Cl.
*B60Q 3/00* (2017.01)
*A01M 1/04* (2006.01)

(52) U.S. Cl.
CPC ............. *A01M 1/04* (2013.01); *B60Q 3/00* (2013.01)

(58) Field of Classification Search
CPC ........ B01D 15/3871; B01D 2015/3895; B01D 2259/802; B60D 1/36; F21V 21/047; F21V 21/088; F21V 21/26; F21V 21/28; F21V 21/29; F21S 8/026
See application file for complete search history.

(56) References Cited

U.S. PATENT DOCUMENTS

| | | | |
|---|---|---|---|
| 3,463,916 A | 8/1969 | De Bella | |
| 3,783,267 A | 1/1974 | Thomas | |
| 3,813,536 A | 5/1974 | Kempkes | |
| 4,220,981 A | 9/1980 | Koether | |
| 4,423,471 A | 12/1983 | Gordin et al. | |
| 5,203,621 A | 4/1993 | Weinsmeister | |
| 5,207,747 A | 5/1993 | Gordin et al. | |
| D381,114 S | 7/1997 | Xu | |
| 6,405,742 B1 * | 6/2002 | Driscoll | A45B 11/00 135/20.1 |
| 6,409,367 B1 * | 6/2002 | Pratt | B60Q 1/2657 362/505 |
| 6,722,380 B1 * | 4/2004 | Hafer | B60R 9/06 135/16 |
| 6,827,363 B1 * | 12/2004 | Amerson | B60D 1/36 280/477 |
| 6,886,968 B1 * | 5/2005 | Hamelink | B60D 1/58 280/163 |
| 7,008,088 B2 * | 3/2006 | Pisciotti | B60Q 1/305 362/485 |
| 7,391,303 B2 * | 6/2008 | Ball | B60D 1/36 280/477 |
| 7,498,686 B2 * | 3/2009 | Capenos | B60Q 1/0088 307/10.1 |
| 7,584,983 B2 * | 9/2009 | McKenney | B60D 1/36 280/477 |
| D613,647 S * | 4/2010 | Gundlach | D12/162 |
| 7,690,670 B1 * | 4/2010 | Lincul | B60D 1/36 280/477 |

(Continued)

*Primary Examiner* — Joseph L Williams
*Assistant Examiner* — Jose M Diaz

(57) ABSTRACT

A portable lighting system includes a vehicle that has a hitch receiver and a lighting system. A lighting unit is removably coupled to the hitch receiver. The lighting unit has a telescopically adjustable height ranging between approximately 1.0 meters and 2.5 meters. Moreover, the lighting unit is selectively positioned in a first position having the lighting unit being vertically oriented. In this way the lighting unit may emit light at a height that is sufficient to attract bugs away from a user. The lighting unit is selectively positioned in second position having the lighting unit being horizontally oriented.

15 Claims, 6 Drawing Sheets

(56) References Cited

U.S. PATENT DOCUMENTS

| | | | | |
|---|---|---|---|---|
| 9,849,825 B2* | 12/2017 | Salami, Jr. | ............ | B60Q 1/0035 |
| 9,968,167 B2* | 5/2018 | Volin | ...................... | A45B 17/00 |
| 2004/0156205 A1* | 8/2004 | Pisciotti | ................. | B60Q 1/305 |
| | | | | 362/485 |
| 2009/0201689 A1* | 8/2009 | Nolle | ........................ | B60P 3/18 |
| | | | | 362/485 |
| 2010/0232148 A1* | 9/2010 | Sharpley | ................... | B60P 3/18 |
| | | | | 362/183 |
| 2012/0327645 A1 | 12/2012 | You et al. | | |
| 2016/0198818 A1* | 7/2016 | Akin | ...................... | A45B 25/00 |
| | | | | 29/592.1 |
| 2017/0114966 A1* | 4/2017 | McCurdy | ................ | F21L 14/00 |
| 2017/0259730 A1* | 9/2017 | Carroll | ..................... | B60P 3/18 |
| 2017/0295895 A1* | 10/2017 | Volin | ...................... | A45B 17/00 |

\* cited by examiner

PORTABLE LIGHTING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to lighting devices and more particularly pertains to a new lighting device for emitting light from an elevated standpoint with respect to a vehicle.

BRIEF SUMMARY OF THE INVENTION

An embodiment of the disclosure meets the needs presented above by generally comprising a vehicle that has a hitch receiver and a lighting system. A lighting unit is removably coupled to the hitch receiver. The lighting unit has a telescopically adjustable height ranging between approximately 1.0 meters and 2.5 meters. Moreover, the lighting unit is selectively positioned in a first position having the lighting unit being vertically oriented. In this way the lighting unit may emit light at a height that is sufficient to attract bugs away from a user. The lighting unit is selectively positioned in second position having the lighting unit being horizontally oriented.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
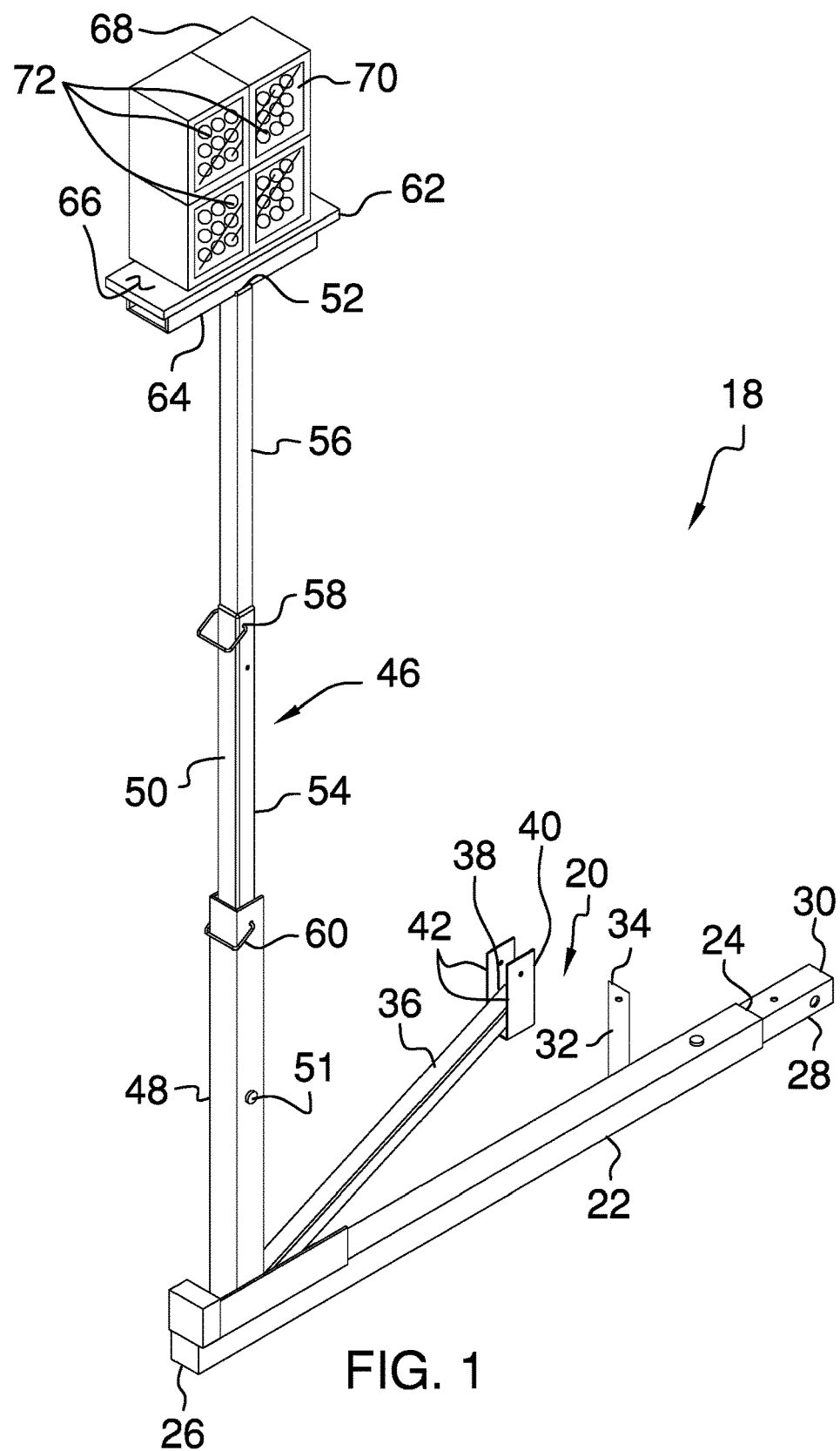
FIG. 1 is a perspective view of a portable lighting system according to an embodiment of the disclosure showing a stand in an upright position.
Figure 2:
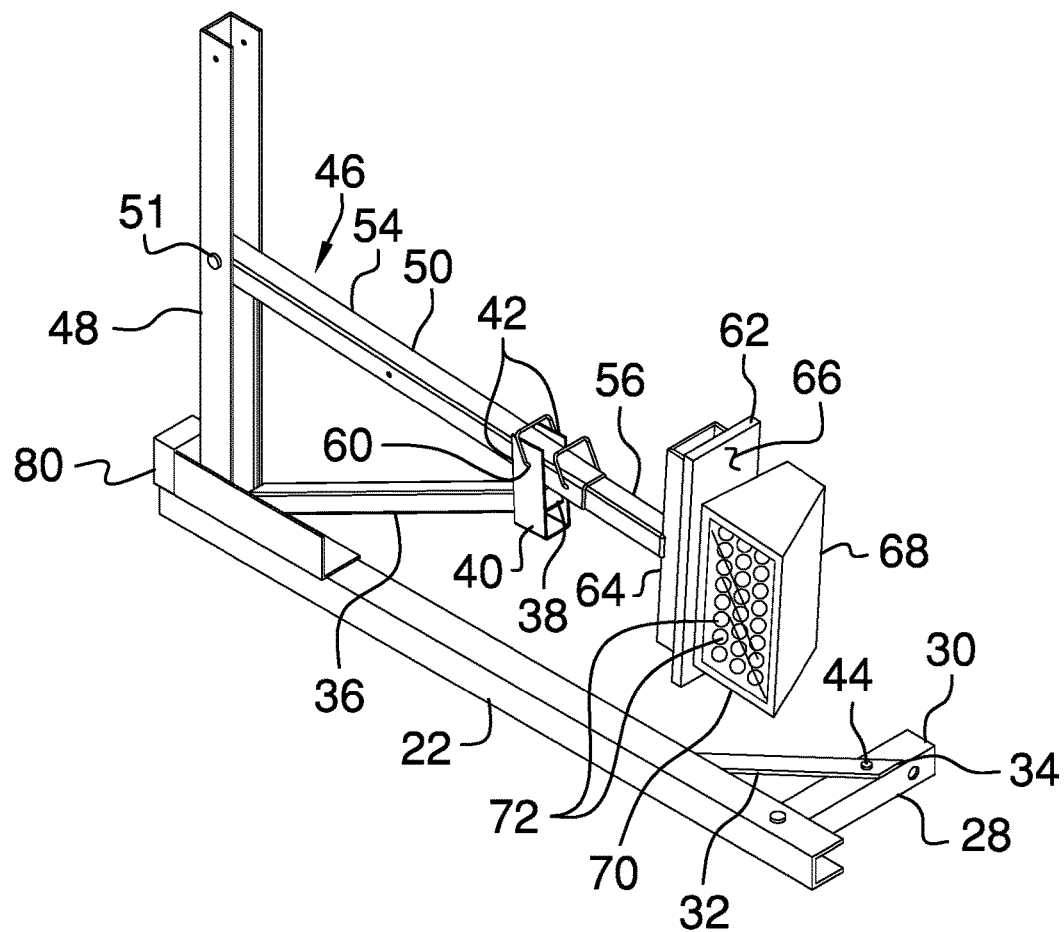
FIG. 2 is a perspective view of an embodiment of the disclosure showing a stand in a horizontal position.
Figure 3:
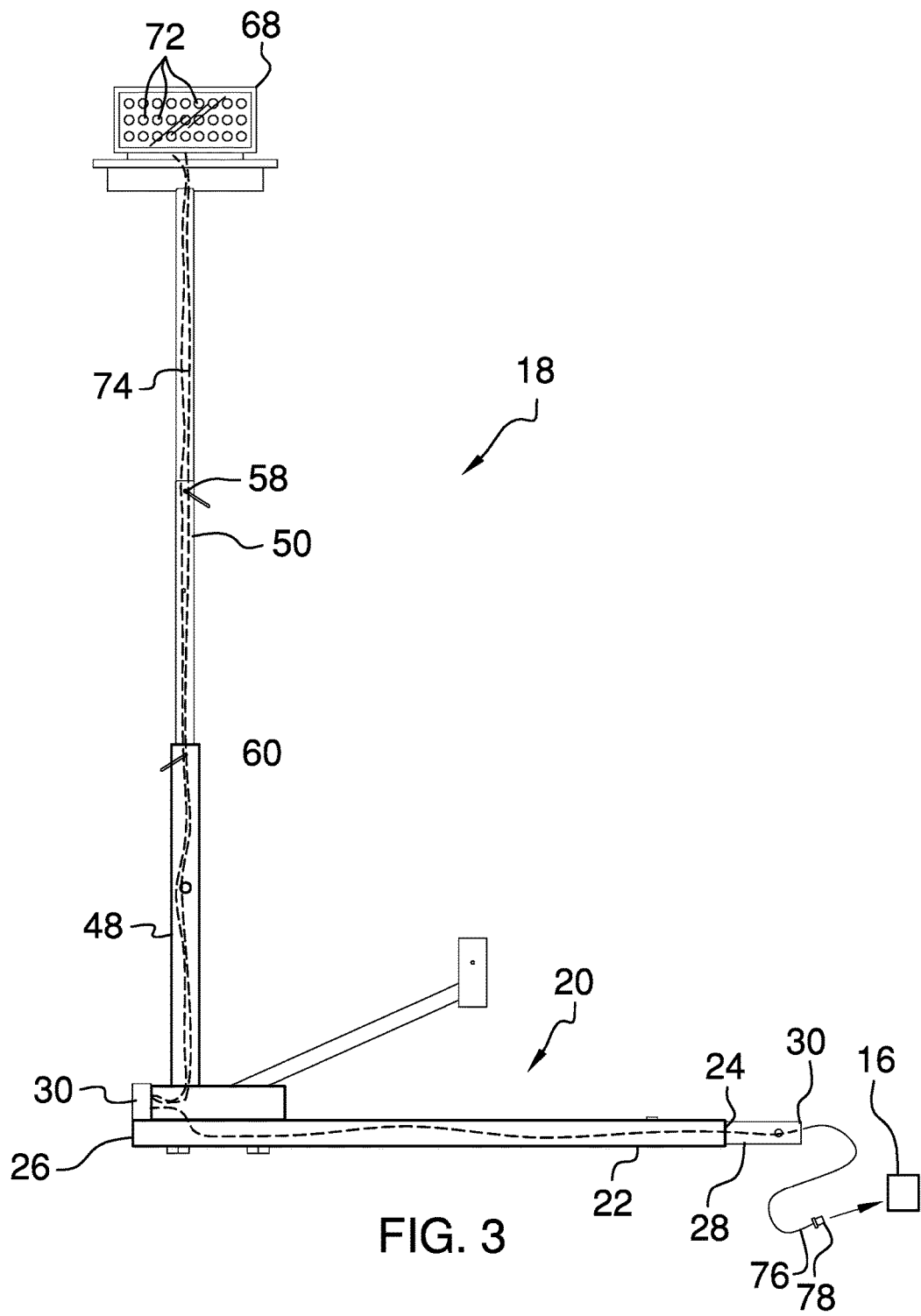
FIG. 3 is a front view of an embodiment of the disclosure showing a stand in an upright position.
Figure 4:
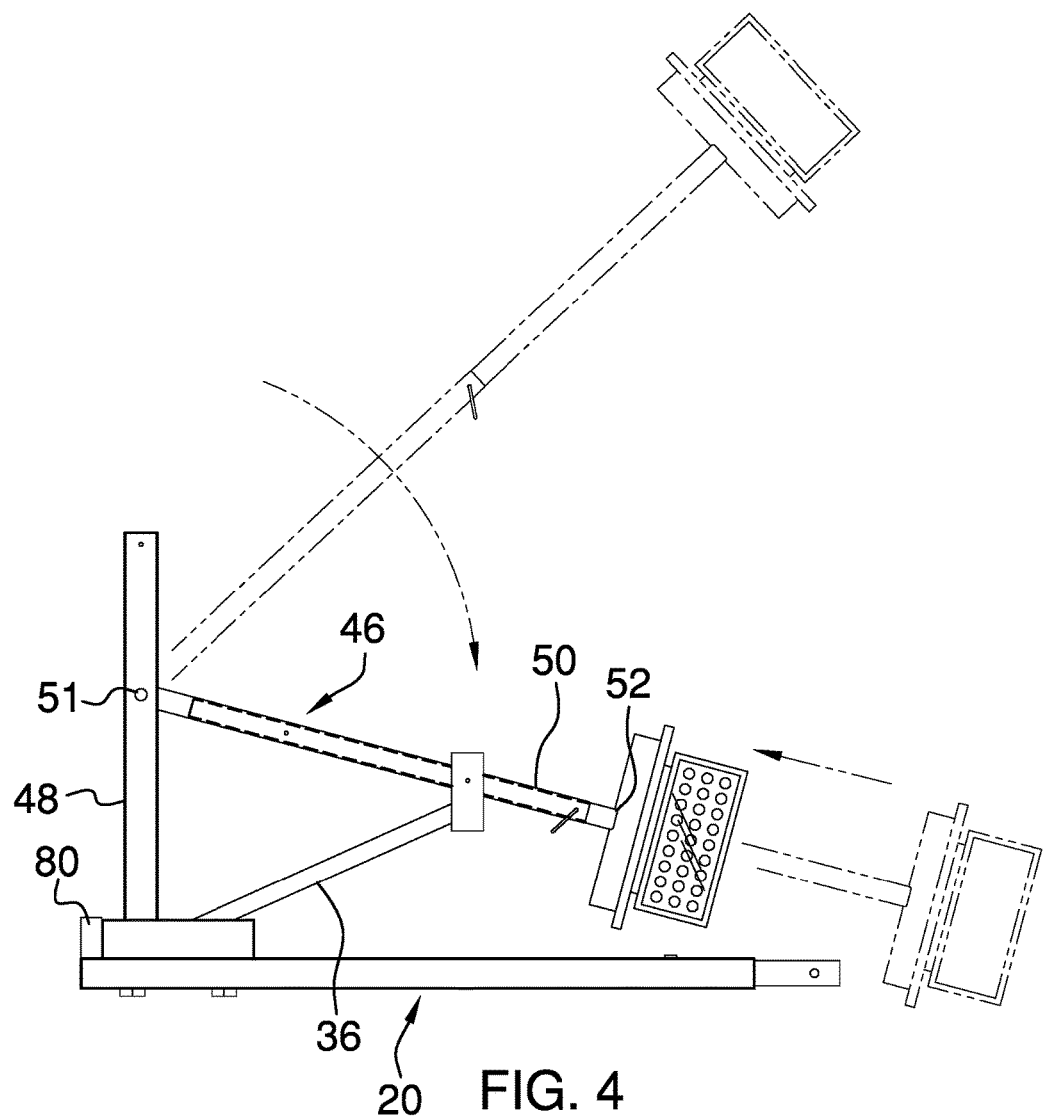
FIG. 4 is a front view of an embodiment of the disclosure showing a stand in a horizontal position.
Figure 5:
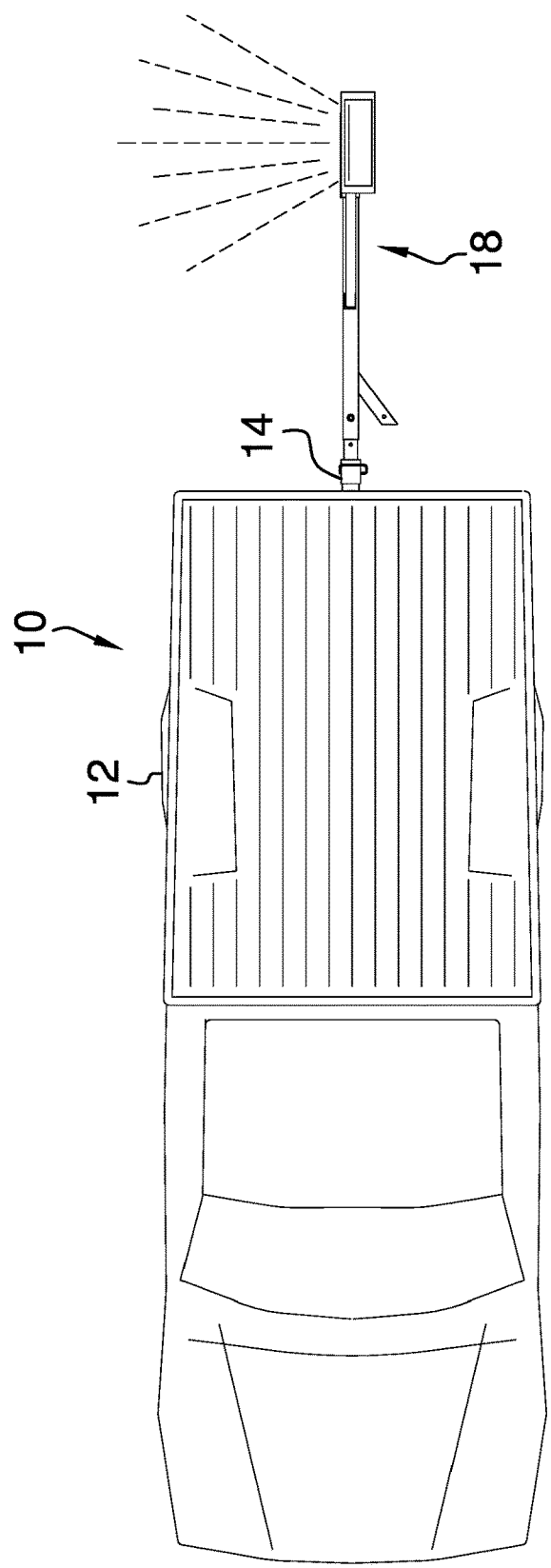
FIG. 5 is a perspective in-use view of an embodiment of the disclosure showing a first member being positioned in a first position.
Figure 6:
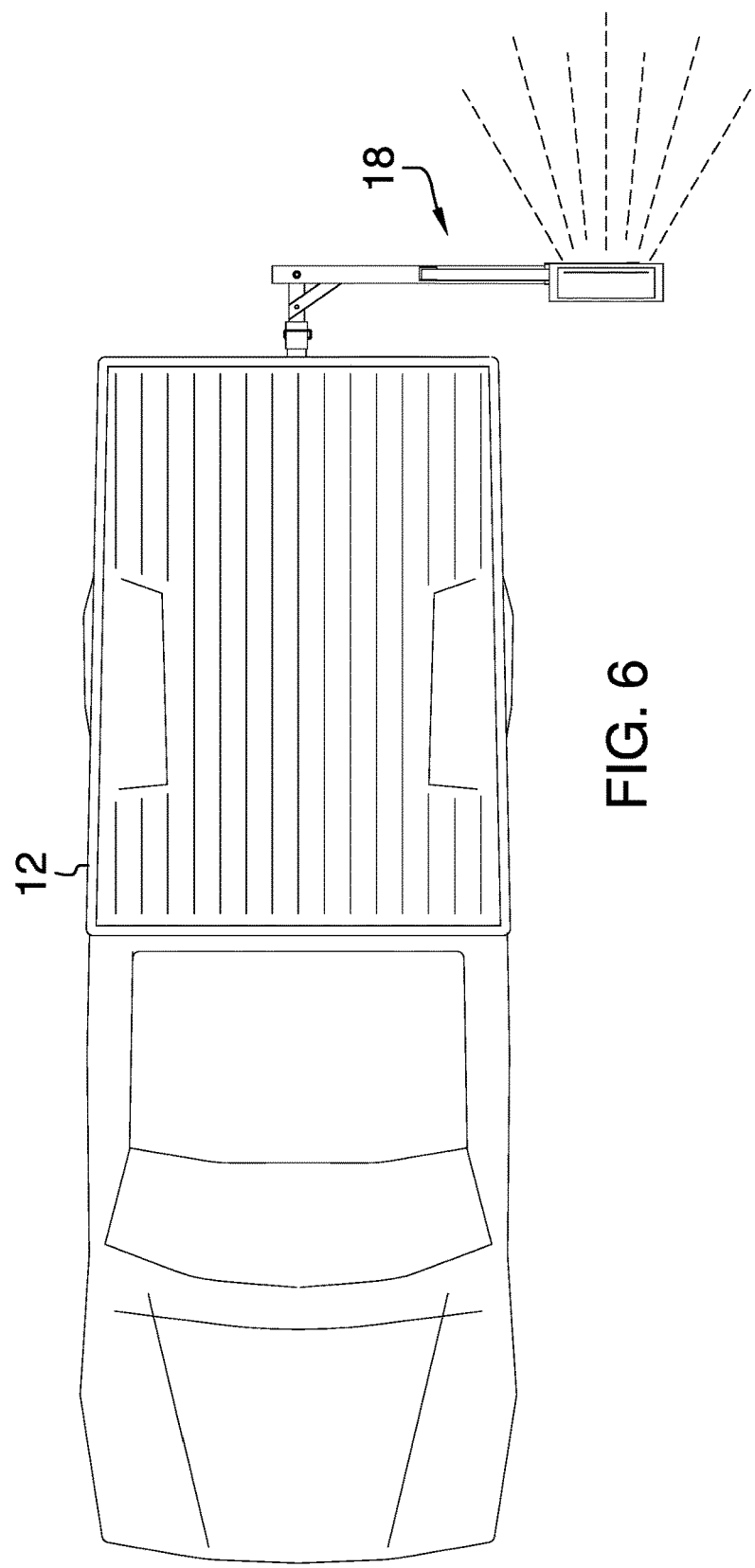
FIG. 6 is a perspective view of an embodiment of the disclosure showing a first member being positioned in a second position.

With reference now to the drawings, and in particular to FIGS. 1 through 6 thereof, a new lighting device embodying the principles and concepts of an embodiment of the disclosure and generally designated by the reference numeral 10 will be described.

As best illustrated in FIGS. 1 through 6, the portable lighting system 10 generally comprises a vehicle 12 that has a hitch receiver 14 and a lighting system 16. The hitch receiver 14 may be positioned on a back side of the vehicle 12. The vehicle 12 may be a pickup, a flat bed truck, a passenger vehicle, or any other vehicle having a hitch receiver 14.

A lighting unit 18 is provided and the lighting unit 18 is removably coupled to the hitch receiver 14. The lighting unit 18 has a telescopically adjustable height ranging between approximately 1.0 meters and 2.5 meters. The lighting unit 18 is selectively positioned in a first position having the lighting unit 18 being vertically oriented. In this way the lighting unit 18 may emit light at a height that is sufficient to attract bugs away from a user. The lighting unit 18 is selectively positioned in second position having the lighting unit 18 being horizontally oriented.

The lighting unit 18 comprises a mount 20 that is removably coupled to the hitch receiver 14. The mount 20 comprises a first member 22 that has a first end 24 and a second end 26. A second member 28 is hingedly coupled to the first end 24 and the second member 28 has a distal end 30 with respect to the first member 22. The hitch receiver 14 insertably receives the distal end 30 of the second member 28. The second member 28 may have a length ranging between approximately 30.0 cm and 40.0 cm. The first member 22 may have a length ranging between approximately 76.0 cm and 100.0 cm.

The first member 22 is selectively positioned in a first position having the second member 28 being oriented collinear with the first member 22. In this way the first member 22 extends rearwardly away from the back side of the vehicle 12. The first member 22 is selectively positioned in a second position having the second member 28 forming an angle with the first member 22. In this way the first member 22 is oriented to collinear with the back side of the vehicle 12.

A stop 32 is coupled to and extends away from the first member 22. The stop 32 has a distal end 34 with respect to the first member 22 and the distal end 34 of the stop 32 is spaced from the first end 24 of the first member 22. A third member 36 is coupled to and extends away from the first member 22. The third member 36 is oriented to form an angle with the first member 22 and the third member 36 has a distal end 38 with respect to the first member 22.

A receiver 40 is coupled to the distal end 38 of the third member 36 and the receiver 40 comprises a pair of spaced plates 42. A first pin 44 is provided and the first pin 44 may be manipulated. The first pin 44 is positioned to extend through the first end 24 of the first member 22 and engage the second member 28. In this way the first pin 44 retains the second member 28 in the first position. The first pin 44 is positioned to extend through the distal end of the stop 32 and engage the second member 28. In this way the first pin 44 retains the second member 28 in the second position.

A stand 46 is provided and the stand 46 is coupled to the mount 20. The stand 46 is selectively positioned between an upright position and a horizontal position. The stand 46 is oriented to extend upwardly from the vehicle 12 when the stand 46 is in the upright position. Additionally, the stand 46 is oriented to be collinear with the back side of the vehicle 12 when the stand 46 is positioned in the horizontal position.

The stand 46 comprises a fourth member 48 that is coupled to and extends away from the first member 22. The fourth member 48 is aligned with the second end 26 of the first member 22 and the fourth member 48 is oriented perpendicular to the first member 22. The fourth member 48 may have a length ranging between approximately 30.0 cm and 35.0 cm. Moreover, the fourth member 48 may be a channel or the like that has a pair of spaced walls.

A fifth member 50 is hingedly coupled to the fourth member 48 at a hinge point 51 and the fifth member 50 has a distal end 52 with respect to the fourth member 48. The hinge point 51 is centrally positioned on the fourth member 48. The fifth member 50 is oriented collinear with the fourth member 48 when the stand 46 is positioned in the upright position. The fifth member 50 is oriented substantially parallel with the first member 22 when the stand 46 is positioned in the horizontal position. The fifth member 50 is positioned between the spaced plates 42 corresponding to the receiver 40 when the stand 46 is positioned in the horizontal position. Thus, the fourth member 48 supports the fifth member 50.

The fifth member 50 comprises a first half 54 that is slidably coupled to a second half 56 such that the fifth member 50 has a telescopically adjustable length. The first half 54 may have a length ranging between approximately 76.0 cm and 100.0 cm. The second half 56 may have a length ranging between approximately 100.0 cm and 127 cm. The telescopic length of the fifth member 50 may range between approximately 90.0 cm and 2.0 meters.

A second pin 58 is provided and the second pin 58 may be manipulated. The second pin 58 extends through the first half 54 and engages the second half 56 at a selected point along the second half 56 to retain the fifth member 50 at a selected length. A third pin 60 is provided and the third pin 60 may be manipulated. The third pin 60 is positioned to extend through the fourth member 48 and engage the fifth member 50 when the stand 46 is positioned in the upright position. The third pin 60 is positioned to extend through the spaced plates 42 and the fifth member 50 when the stand 46 is positioned in the horizontal position.

A plate 62 is provided that has a first surface 64 and a second surface 66. The first surface 64 is coupled to the distal end 52 of the fifth member 50. A housing 68 is coupled to the second surface of the plate and the housing 68 has a front side 70. A plurality of light emitters 72 is provided and each of the light emitters 72 is coupled to the front side 70 of the housing 68. In this way each of the light emitters 72 selectively emits light outwardly from the housing 68. Each of the light emitters 72 may be an LED or the like.

A conductor 74 is electrically coupled to each of the light emitters 72. The conductor 74 extends through each of the fifth member 50, the fourth member 48, the third member 36, the second member 28 and the first member 22. The conductor 74 has a distal end 76 with respect to the second member 28 and a plug 78 is electrically coupled to the distal end 76 of the conductor 74. The plug 78 is selectively electrically coupled to the lighting system 16 of the vehicle 12. The plug 78 may be a four pin trailer light connector or the like.

A grounding plate 80 is provided and the grounding plate 80 is coupled to the stand 46. The grounding plate 80 may be positioned at an intersection of the third member 36 and the first member 22. Additionally, the conductor 74 may be electrically coupled to the grounding plate 80. The grounding plate 80 may electrically engage the vehicle 12 thereby providing a ground for the lighting unit 18. The grounding plate 80 may be comprised of an electrically conductive material.

In use, the distal end 30 of the second member 28 is inserted into the hitch receiver 14. The plug on the conductor 74 is electrically coupled to the lighting system 16 on the vehicle 12. The first member 22 is manipulated into the first position to extend the first member 22 rearwardly from the back side of the vehicle 12. The stand 46 is positioned in the upright position and the fifth member 50 is adjusted to a selected height. In this way the lighting unit 18 is spaced above the vehicle 12 thereby drawing insects away from the user when the light emitters 72 are turned on. Additionally, the light emitters 72 are inhibited from creating shadows adjacent to the vehicle 12 when the stand 46 in the upright position thereby enhancing visibility in a darkened environment. The stand 46 is positioned in the horizontal position to position the light emitter at approximately eye level with the user.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:
1. A portable lighting system comprising:
  a vehicle having a hitch receiver and a lighting system; and
  a lighting unit being removably coupled to said hitch receiver, said lighting unit having a telescopically adjustable height ranging between approximately 1.0 meters and 2.5 meters, said lighting unit being selectively positioned in a first position having said lighting unit being vertically oriented wherein said lighting unit is configured to emit light at a height being sufficient to attract bugs away from a user, said lighting unit being selectively positioned in second position having said lighting unit being horizontally oriented, said lighting unit comprises a mount being removably coupled to said hitch receiver, said mount comprising
    a first member having a first end and a second end, and
    a second member being hingedly coupled to said first end, said second member having a distal end with respect to said first member, hitch receiver insertably receiving said distal end, said first member being selectively positioned in a first position having said second member being oriented collinear with said first member, said first member being selectively positioned in a second position having said second member forming an angle with said first member.

2. The system according to claim 1, further comprising a stop being coupled to and extending away from said first member, said stop having a distal end with respect to said first member, said distal end of said stop being spaced from said first end of said first member.

3. The system according to claim 1, further comprising a third member being coupled to and extending away from said first member, said third member being oriented to form an angle with said first member, said third member having a distal end with respect to said first member.

4. A portable lighting system comprising:
  a vehicle having a hitch receiver and a lighting system; and
  a lighting unit being removably coupled to said hitch receiver, said lighting unit having a telescopically adjustable height ranging between approximately 1.0 meters and 2.5 meters, said lighting unit being selectively positioned in a first position having said lighting unit being vertically oriented wherein said lighting unit is configured to emit light at a height being sufficient to attract bugs away from a user, said lighting unit being selectively positioned in second position having said lighting unit being horizontally oriented, said lighting unit comprises a mount being removably coupled to said hitch receiver, said mount comprising a first member having a first end and a second end;
  a second member being hingedly coupled to said first end;
  a third member being coupled to and extending away from said first member, said third member being oriented to form an angle with said first member, said third member having a distal end with respect to said first member; and
  a receiver being coupled to said distal end of said third member, said receiver comprising a pair of spaced plates.

5. The system according to claim 1, further comprising:
  a stop: and
  a first pin being configured to be manipulated, said first pin being positioned to extend through said first end of said first member and engage said second member to retain said second member in said first position, said first pin being positioned to extend through said distal end of said stop and engage said second member to retain said second member in said second position.

6. The system according to claim 1, further comprising a stand being coupled to said mount, said stand being selectively positioned between an upright position and a horizontal position.

7. A portable lighting system comprising:
  a vehicle having a hitch receiver and a lighting system; and
  a lighting unit being removably coupled to said hitch receiver, said lighting unit having a telescopically adjustable height ranging between approximately 1.0 meters and 2.5 meters, said lighting unit being selectively positioned in a first position having said lighting unit being vertically oriented wherein said lighting unit is configured to emit light at a height being sufficient to attract bugs away from a user, said lighting unit being selectively positioned in second position having said lighting unit being horizontally oriented, said lighting unit comprises a mount being removably coupled to said hitch receiver, said mount comprising a first member having a first end and a second end;
  a second member being hingedly coupled to said first end;
  a third member being coupled to and extending away from said first member;
  a stand being coupled to said mount, said stand being selectively positioned between an upright position and a horizontal position, said stand comprises a fourth member being coupled to and extending away from said first member, said fourth member being aligned with said second end of said first member, said fourth member being oriented perpendicular to said first member.

8. The system according to claim 7, further comprising a fifth member being hingedly coupled to said fourth member, said fifth member having a distal end with respect to said fourth member, said fifth member being oriented collinear with said fourth member when said stand is positioned in said upright position, said fifth member being oriented parallel with said first member when said stand is positioned in said horizontal position.

9. The system according to claim 8, further comprising:
  a receiver being coupled to said third member, said receiver comprising spaced plates; and
  said fifth member being positioned between said spaced plates corresponding to said receiver when said stand is positioned in said horizontal position such that said third member supports said fifth member, said fifth member comprising a first half being slidably coupled to a second half such that said fifth member has a telescopically adjustable length.

10. The system according to claim 9, further comprising a second pin being configured to be manipulated, said second pin extending through said first half and engaging said second half at a selected point along said second half to retain said fifth member at a selected length.

11. The system according to claim 9, further comprising a third pin being configured to be manipulated, said third pin being positioned to extend through said fourth member and engage said fifth member when said stand is positioned in said upright position, said third pin being positioned to extend through said spaced plates and said fifth member when said stand is positioned in said horizontal position.

12. The system according to claim 8, further comprising a plate having a first surface and a second surface, said first surface being coupled to said distal end of said fifth member.

13. The system according to claim 12, further comprising:
a housing being coupled to said second surface of said plate, said housing having a front side; and
a plurality of light emitters, each of said light emitters being coupled to said front side of said housing wherein each of said light emitters is configured to emit light outwardly from said housing.

14. The system according to claim 8, further comprising a conductor being electrically coupled to each of said light emitters, said conductor extending through each of said fifth member, said fourth member, said third member, said second member and said first member, said conductor having a distal end with respect to said second member, said distal end having a plug being electrically coupled thereto, said plug being selectively electrically coupled to said lighting system of said vehicle.

15. The system of claim 1, further comprising:
said mount comprising:
a stop being coupled to and extending away from said first member, said stop having a distal end with respect to said first member, said distal end of said stop being spaced from said first end of said first member,
a third member being coupled to and extending away from said first member, said third member being oriented to form an angle with said first member, said third member having a distal end with respect to said first member,
a receiver being coupled to said distal end of said third member, said receiver comprising a pair of spaced plates,
a first pin being configured to be manipulated, said first pin being positioned to extend through said first end of said first member and engage said second member to retain said first member in said first position, said first pin being positioned to extend through said distal end of said stop and engage said second member to retain said first member in said second position;
a stand being coupled to said mount, said stand being selectively positioned between an upright position and a horizontal position, said stand comprising:
a fourth member being coupled to and extending away from said first member, said fourth member being aligned with said second end of said first member, said fourth member being oriented perpendicular to said first member,
a fifth member being hingedly coupled to said fourth member, said fifth member having a distal end with respect to said fourth member, said fifth member being oriented collinear with said fourth member when said stand is positioned in said upright position, said fifth member being oriented parallel with said first member when said stand is positioned in said horizontal position, said fifth member being positioned between said spaced plates corresponding to said receiver when said stand is positioned in said horizontal position such that said fourth member supports said fifth member, said fifth member comprising a first half being slidably coupled to a second half such that said fifth member has a telescopically adjustable length,
a second pin being configured to be manipulated, said second pin extending through said first half and engaging said second half at a selected point along said second half to retain said fifth member at a selected length,
a third pin being configured to be manipulated, said third pin being positioned to extend through said fourth member and engage said fifth member when said stand is positioned in said upright position, said third pin being positioned to extend through said spaced plates and said fifth member when said stand is positioned in said horizontal position, and
a plate having a first surface and a second surface, said first surface being coupled to said distal end of said fifth member;
a housing being coupled to said second surface of said plate, said housing having a front side,
a plurality of light emitters, each of said light emitters being coupled to said front side of said housing wherein each of said light emitters is configured to emit light outwardly from said housing, and
a conductor being electrically coupled to each of said light emitters, said conductor extending through each of said fifth member, said fourth member, said third member, said second member and said first member, said conductor having a distal end with respect to said second member, said distal end having a plug being electrically coupled thereto, said plug being selectively electrically coupled to said lighting system of said vehicle.

\* \* \* \* \*